United States Patent [19]

Fenton et al.

[11] Patent Number: 4,988,011

[45] Date of Patent: Jan. 29, 1991

[54] EXPLOSION RESISTANT FUEL CONTAINER APPARATUS

[75] Inventors: Ronald L. Fenton, Wood Dale, Ill.; Robert Brandt, New York, N.Y.

[73] Assignee: Safetytech Corporation, Mount Prospect, Ill.

[21] Appl. No.: 460,401

[22] Filed: Jan. 3, 1990

Related U.S. Application Data

[63] Continuation-in-part of Ser. No. 391,237, Aug. 9, 1989, abandoned.

[51] Int. Cl.$^5$ .............................................. B65D 25/16
[52] U.S. Cl. ................................. 220/88.1; 220/453; 220/654; 220/669
[58] Field of Search .......................... 220/88 R, 88 A

[56] References Cited

U.S. PATENT DOCUMENTS

| | | | |
|---|---|---|---|
| 3,047,184 | 7/1962 | Van Bergen | 220/88 R |
| 3,951,718 | 4/1976 | Gonzalez | 220/453 |
| 4,018,983 | 4/1977 | Pedlow | 220/88 R |
| 4,149,649 | 4/1979 | Szego | 220/88 A |
| 4,230,758 | 10/1980 | Nagai | 220/456 |
| 4,581,285 | 4/1986 | Mahefkey | 220/452 |
| 4,615,455 | 10/1986 | Tansill | 220/88 R |
| 4,673,098 | 6/1987 | Fenton | 220/88 A |
| 4,765,458 | 8/1988 | Flanigen | 220/88 R |
| 4,766,420 | 8/1988 | Hastings | 220/453 |

*Primary Examiner*—George E. Lowrance
*Assistant Examiner*—S. Castellano
*Attorney, Agent, or Firm*—Douglas B. White

[57] ABSTRACT

Generally there is provided an exterior tank shell, typically of aluminum composition, having as an interior shell a layer of a stiff and strong material, such as aluminum oxide or a fiber/resin composite, applied to the inside surface of the shell. A thermally conductive mesh filler insert is fitted within the tank and secured to the inner shell layer with adhesive.

8 Claims, 2 Drawing Sheets

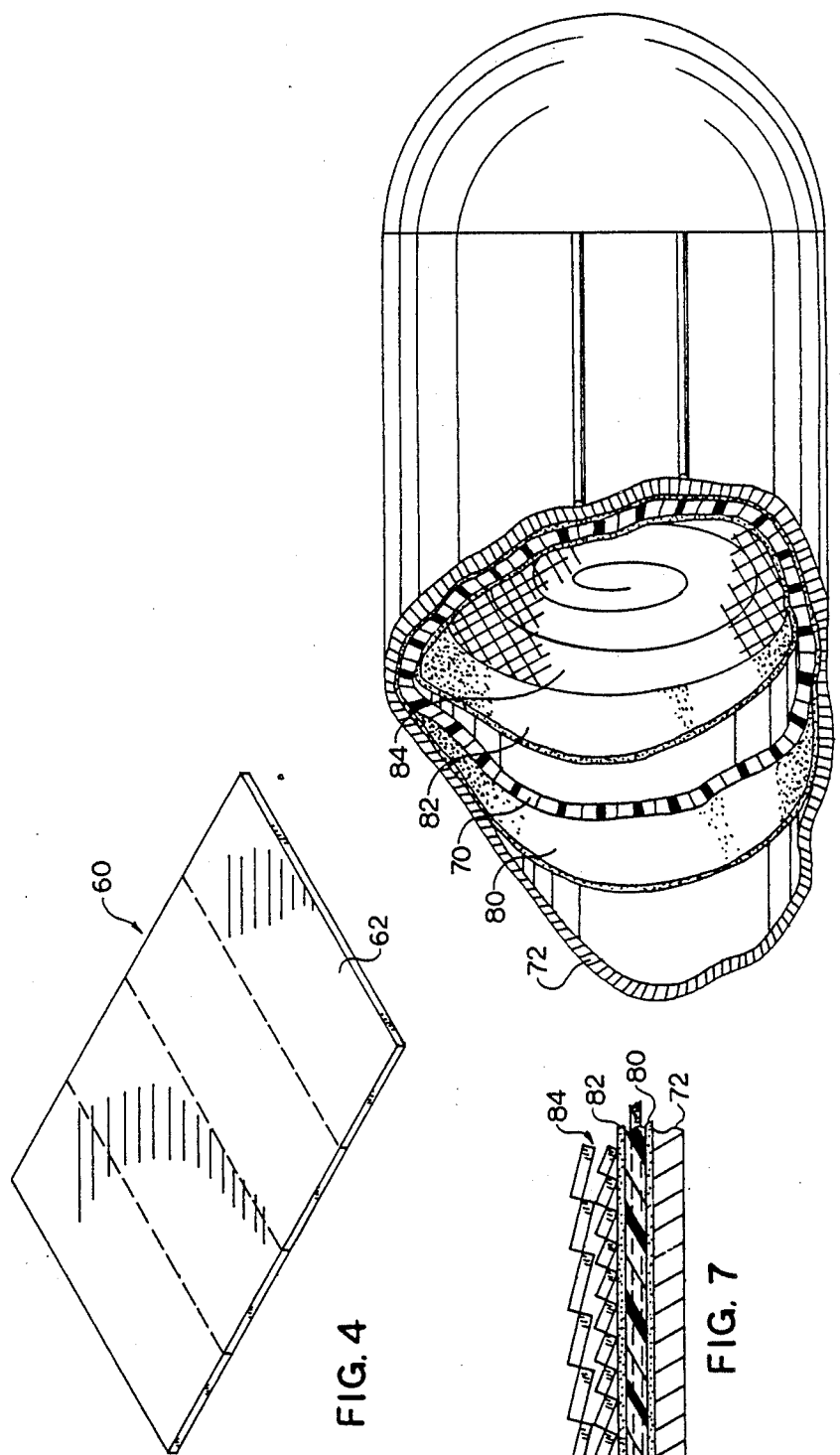

EXPLOSION RESISTANT FUEL CONTAINER APPARATUS

This application is a continuation-in-part of Ser. No. 07/391,237, filed Aug. 9, 1989, now abandoned.

BACKGROUND OF THE INVENTION

1. Field of the Invention

The present invention relates generally to fuel tanks used for flammable or explosive fluids such as gasoline, diesel fuel, and LP-Gas; and more particularly this invention relates to tanks employing thermal distribution to suppress explosion. This invention further relates to improvements in such apparatus for use with lightweight transportable tanks, and more precisely with aluminum tanks, which tend to lose structural integrity under high heat.

2. Description of the Prior Art

In a LP-Gas fuel tank application there is generally provided a metallic tank wall designed to contain the fuel under pressure. This tank is typically of steel composition for stationary applications and further includes associated valves and connections at one end for access to the contents thereof. When the tank is in a heated environment, such as in a fire, the liquid proximate the hot spot will boil and eventually ignite, with a resulting explosion. Prior attempts to neutralize the explosion tendencies of the tank have included providing an expanded aluminum foil mesh as a filler mass insert within the tank. Such a system is described in Canadian Patent No. 736,802. The container is filled with a mesh which divides the container into many small cell-like compartments, and through thermal contact with the mesh the fuel transfers the heat away from the "hot spot" to delay the local rise in temperature—and delay the explosion.

Improvements in tank design have recently been directed to preventing nesting of the mesh insert by reversing alternate layers in a roll. Nesting occurs where the mesh pattern of adjacent layers settle against each other in a mating relation. A recent anti-nesting system is described in U.S. Pat. No. 4,149,649. Even with the anti-nesting technique of the prior art, the lightweight foil of the mesh tended to collapse and compress and its effectiveness diminished during use; this is particularly true for transportable containers, and vehicular fuel tanks. Recently a new technique described in U.S. Pat. No. 4,673,098, issued to Fenton et.al., dramatically improved the thermal conductivity and reduced the compression effect. This method used a thermally conductive adhesive to secure the filler mass within the tank. This kept the filler structure intact and yet facilitated the thermal transfer to the liquid from the adjoining tank surface.

In the vehicle tank industry and in the design of transportable tanks, weight is of high importance and tanks of aluminum composition have been utilitzed. Unfortunately, the aluminum tank wall tends to melt at such a low temperature that its structural integrity is quickly lost in a fire. Attempts to insulate or coat the outer surface of such tanks have proved satisfactory inasmuch as the coating does not remain sufficiently intact to produce reliable results.

SUMMARY OF THE INVENTION

It is accordingly a principal object fo the present invention to provide an explosion suppression tank apparatus with a filler mass insert which is functional with transportable containers and vehicle tanks.

It is a further object of the invention to provide such a tank apparatus with a filler mass for a fuel tank which prevents nesting, provides increased thermal transfer through better interstitial flow, but yet is economical to manufacture.

It is finally an object of the present invention to provide a lightweight internal shell layer which in one aspect exhibits thermal transfer to delay explosion in a fire but also temporarily contains the fuel during limited failure of the outer shell.

Generally there is provided an outer shell, typically of aluminum composition, having an inner shell composed of a layer of strong, stiff and thermally conductive material adhered to the inside surface of the outer shell. The inner shell layer may be an aluminum oxide layer or of a hydrocarbon compatible fiber and resin composite. In one embodiment a layer of thermally conductive adhesive is applied on the inner surface of the inner shell and a mesh insert is fitted within and secured to the inner shell with the adhesive. In another embodiment the resin of the fiber/resin composite acts to adhere the inner shell layer to the outer wall and to secure the mesh insert to the inner shell layer.

BRIEF DESCRIPTION OF THE DRAWINGS

FIG. 4 is a perspective view of a sheet of a hydrocarbon compatible composite.

FIG. 5 is a perspective view of a section of the sheet of FIG. 4 cut and formed to fit within the tank.

FIG. 6 is a cut-away perspective of the tank employing an inner shell layer formed with a fiber and resin composite.

FIG. 7 is a cross-sectional view of the wall portion of the tank of FIG. 6.

While the invention will be described in connection with a preferred embodiment, it will be understood that we do not intend to limit the invention to that embodiment. On the contrary, we intend to cover all alternatives, modifications, and equivalents as may be included within the spirit and scope of the invention as defined by the appaended claims.

DESCRIPTION OF THE PREFERRED EMBODIMENT

Figure 1:
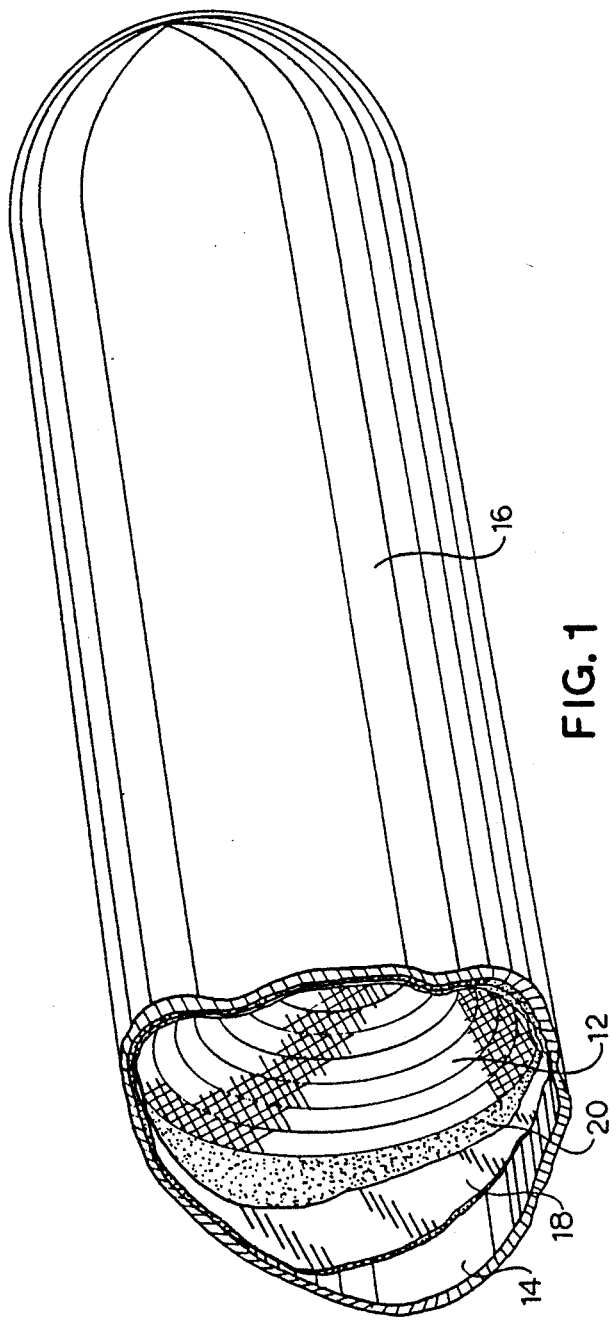
FIG. 1 is a partially cut-away perspective view of the tank apparatus in accordance with the present invention employing a filler insert secured therein.

Turning first to FIG. 1 there is shown a tank constructed in accordance with the present invention having a thermal mass 12 of expanded foil mesh positioned within the tank. The actual construction of the mesh insert is well known in the art and involves the placement of a plurality of slits in a sheet of thermally conductive foil, such as an aluminum foil, and then pulling of the sheet to expand the openings. In the manufacture of the sheet, an array of slits of predetermined dimension establish the size and shape of the openings produced when the sheet is pulled and expanded.

In one embodiment of the tank construction of the present invention, the structural outer shell (forming the primary container wall) is manufactured in accordance with commonly known tank manufacturing techniques and the interior sufrace 14 of the tank outer shell 16 is provided with a thin, yet stiff, inner shell 18 (forming a secondary container wall). This inner shell is (in one embodiment) a coating of a type which is easily applied and when in service is resistant to deterioration by hydrocarbons. Preferably this material is of high thermal conductivity, and is applied in a spray, similar to a paint application. An aluminum oxide spray accomplishes these purposes and produces an effective layer having a finished thickness in the range of 1/16th of an inch or less (greater thickness is acceptable where weight is less critical). The dried coating presents a stiff thermally conductive layer which forms an inner shell and is adhered to the outer aluminum shell.

The physical characteristics of this layer is such that it begins to lose its structural integrity at a temperature which is higher than the temperature at which the outer aluminum shell begins to lose its structural integrity (melting temperature).

Overlying the inner surface of the interior shell there is provided a layer of adhesive 20. The formed filler insert 12 having interstitial openings throughout is secured within the inner shell by adhesive. This adhesive is chosen for qualities of both thermal transfer and hydrocarbon resistance, and satisfactory results have been obtained with an adhesive known as EC 776 manufactured by the 3M Corporation.

Figure 2:
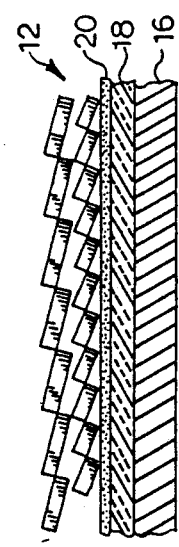
FIG. 2 is a cross sectional view of the layers of FIG. 1 proximate the tank wall.

As best seen in FIG. 2 the filler 12 is secured along its outer surface to the inner shell coating 20 to form an internal reinforcement to the thin inner shell. The unique function of this apparatus in a high heat environment is determined by this combination of shells of differing melting temperatures. As the tmeperature around the tank rises, the tank absorbs the heat in its outer shell in the first instance. As the temperature of a localized portion of the lightweight aluminum outer shell rises, the inner shell proximate to that hot spot heats up but also transfers heat laterally throughout the inner shell layer as well as vertically to the interior of the tank through the filler insert. To the extent that heat is transferred through the inner and outer shells, the adhesive and the mesh insert carry the heat to the remainder of the tank. As temperatures continue to elevate and where the outer shell approaches its critical melting temperature, the inner shell continues to remain intact due to its higher melting temperature. This fragile inner shell, using the adhered mesh insert as structural support, functions to temporarily resist the high internal pressures encountered during the failure of the outer shell.

Figure 3:
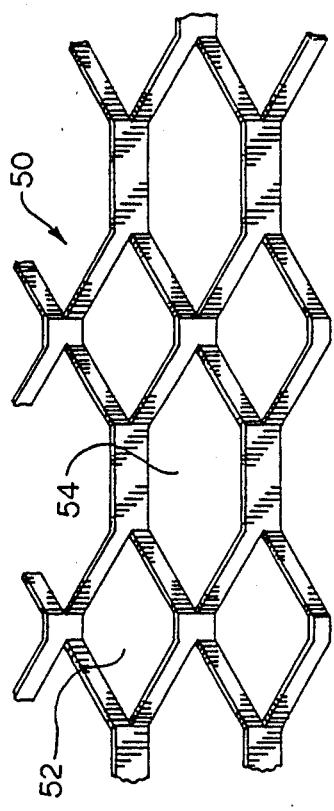
FIG. 3 is a perspective view of a sheet of expanded foil used in forming the filler insert of the tank apparatus, showing an array of openings of various sizes.

Production of the filler mesh insert of the present invention is accomplished (according to methods well known in the art) by forming it from a flat sheet (not shown) which is provided with spaced precisely dimensioned slits. The periphery of the sheet is then pulled to expand the openings to produce the expanded sheet of FIG. 3. Rolling or stacking of the expanded sheet forms the filler insert for the tank. In order to prevent nesting of the neighboring layers of the expanded sheet, a sheet 50 is formed with a array of formed openings of differing dimensions (a pattern of small 52 and large 54 openings). This sheet, or multiple sheets, may then be rolled or stacked together, such that adjacent openings do not match-up; the transverse edges surrounding the openings interfere with one another to prevent nesting. Another version of the above consists of interleaved layers of sheets with each sheet having uniform openings but adjacent sheets having openings of differing size. A first layer includes a sheet presenting openings of one size and an adjacent layer sheet presenting openings of a second size. With the above anti-nesting techniques, larger openings are formable within the tank mesh to increase fuel capacity while maintaining effective thermal function and structural support.

In a second embodiment of the invention shown in FIGS. 4–7, the inner shell is formed from a hydrocarbon compatible fiber and resin composite. Such a composite may consist of fiberglass and epoxy resin. This formed according to methods well known in the fiber/resin industry into a cylindrical shape the size of the inside of the outer shell.

In one method of forming the fiber/resin composite shell, a portion of a cured sheet of 60 fiber cloth impregnated with resin is severed into a section 62 of desired dimension and bent to form a cylinder 70 for insertion into the outer shell 72. An adhesive 80 is applied to the inside of the outer shell and the fiber and resin composite is adhered therein to form an inner shell layer. As before, the inside surface of this inner shell layer is coated with adhesive 82 and the mesh insert 84, formed to fit the tank as described above, is secured therein.

In another of said methods, a roll of uncured resin impregnated fiber cloth is severed in suit able lengths and formed to the inside diameter of the tank. The cylinder is cured in this configuration and adhered to the inside of the tank as described above. The mesh insert is also adhered to the adhesive coated inner shell layer in the same manner.

In another technique, the uncured fiber cloth/resin composite is fitted within the tank and the resin on the surface of the composite used as the adhesive to secure the inner shell layer to the outer shell. Likewise, the inner resinous surface of the composite will serve as the adhesive to adhere the mesh insert within the tank. The composite and the adhesive/resin surfaces are then cured by the addition of heat to the tank assembly.

Another method known in the art employs a mix of resin and chopped fibers which are sprayed onto the inner surface of the outer shell. In such a technique, the outer shell is coated on its inner surface by a layer of the fiber/resin composite. The filler mesh is then inserted as described above. Application of heat cures the resin and adheres the filler mesh and the inner shell within the outer shell.

In yet a further aspect fo the invention the interfacing layer 20 functions as an expendable ablative in the event of high heat. Such a layer exudes a gas or vapor at high heat conditions to displace any fuel which may be proximate the layer. This enhances the explosion protection by preventing contact of the fuel with the hot shell layers. In practice the EC776 adhesive which secures the mesh insert to the inner layer, functions as such an expendable ablative.

From the foregoing description it will be apparent that modifications can be made to the apparatus and method for using same without departing from the teaching of the present invention. Accordingly the scope of the invention is to be limited only as necessitated by the accompanying claims.

We claim:

1. An explosion resistant container for inflammable fluids comprising:
   an outer shell forming a primary wall of the container;

an inner shell affixed within said outer shell to provide a secondary wall of the container;

wherein the temperature at which said inner shell begins to lose its structural integrity is higher than the corresponding temperature of said outer shell; and a filler insert formed to substantially conform to the shape of the container and adhered to said inner shell.

2. The explosion resistant container of claim 1 wherein said inner shell is comprised of a layer of aluminum oxide.

3. The explosion resistant container of claim 2 wherein said filler insert is comprised of multiple layers of thermally conductive sheet having formed openings of differing dimensions in each layer thereof, wherein adjacent layers of said sheet are arranged such that said formed openings of differing dimension are juxtaposed.

4. The explosion resistant container of claim 3 wherein said multiple layers of thermally conductive sheet are formed from a rolled sheet of expanded metallic foil having said formed openings of differing dimensions, wherein said openings of differing dimensions are juxtapose when said sheet is rolled to form said filler insert.

5. The explosion resistant container of claim 1 wherein said inner shell is comprised of a hydrocarbon compatible fiber and resin composite.

6. The explosion resistant container of claim 5 wherein said filler insert is comprised of multiple layers of thermally conductive sheet having formed openings of differing dimensions in each layer thereof, wherein adjacent layers of said sheet are arranged such that said formed openings of differing dimension are juxtaposed.

7. The explosion resistant container of claim 6 wherein said multiple layers of thermally conductive sheet are formed from a rolled sheet of expanded metallic foil having said formed openings of differing dimensions, wherein said openings of differing dimension are juxtapose when said sheet is rolled to form said filler insert.

8. The explosion resistant container of claim 1 further comprising an expendable ablative interposed between said filler insert and said inner shell.

* * * * *